(No Model.)
J. A. MANZ.
APPARATUS FOR THE PRODUCTION OF MALT LIQUORS.
No. 512,311. Patented Jan. 9, 1894.
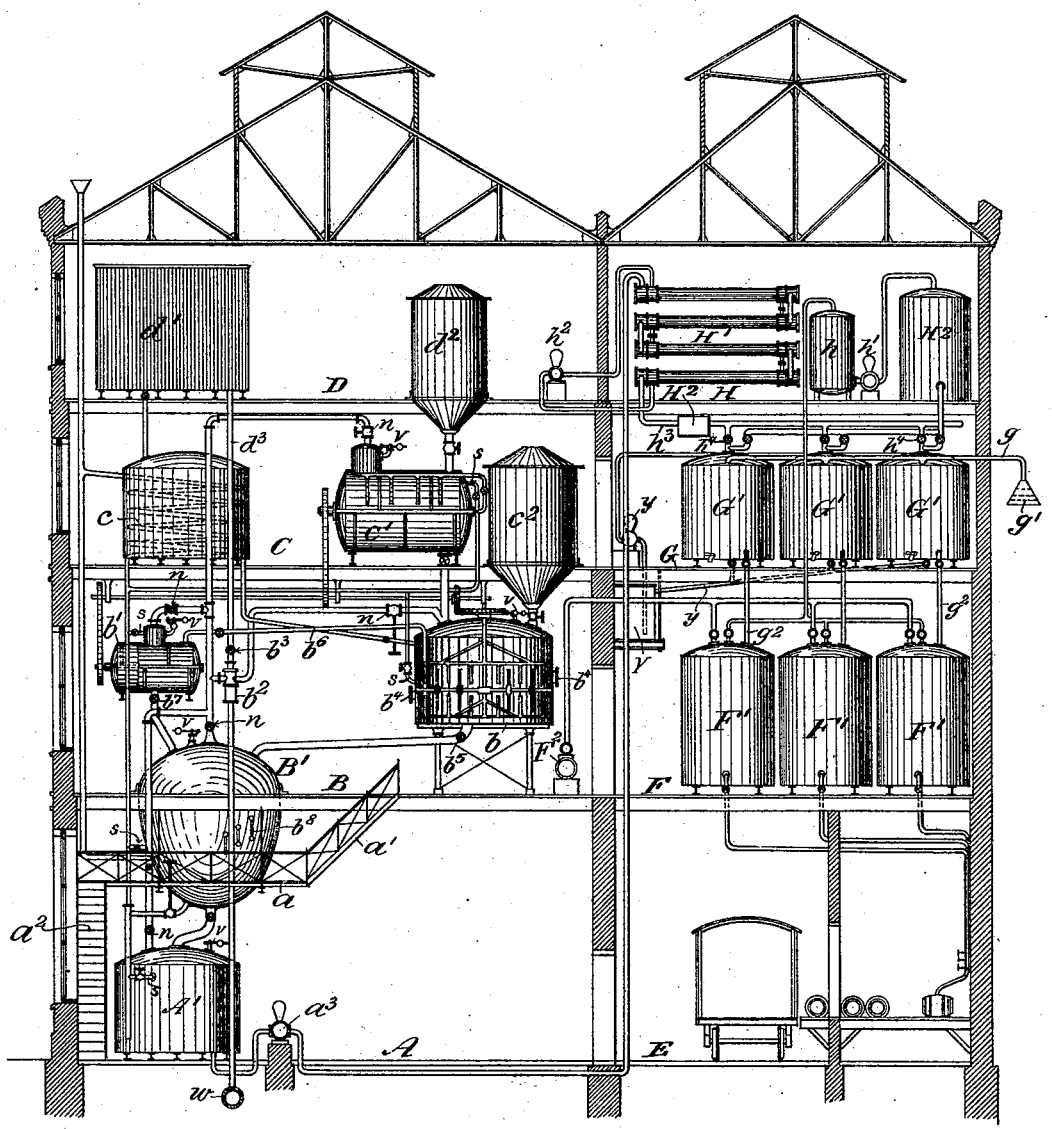
Witnesses:
Carl Hettinger
Rob't Gillespie
Inventor:
John A. Manz
by Hermann Bornmann.
att'y.

UNITED STATES PATENT OFFICE.

JOHN A. MANZ, OF PHILADELPHIA, PENNSYLVANIA.

APPARATUS FOR THE PRODUCTION OF MALT LIQUORS.

SPECIFICATION forming part of Letters Patent No. 512,311, dated January 9, 1894.

Application filed April 15, 1893. Serial No. 470,422. (No model.)

*To all whom it may concern:*

Be it known that I, JOHN A. MANZ, a citizen of the United States, residing at Philadelphia, in the county of Philadelphia and State of Pennsylvania, have invented certain new and Improved Apparatus for the Production of Malt Liquors, of which the following is a specification.

The object of my invention is to provide apparatus for the production of malt liquors, which have all the properties and qualities of the best of such liquors heretofore brewed, to conduct the process of brewing in about one fourth of the time as is now expended to produce the said liquor, and to increase the yield of wort, both in quality and quantity from the ingredients used, whereby a saving is effected, first in the cost of a plant to produce malt liquors, as the plant and apparatus need only be one third or one fourth of the size of those heretofore use to brew the same quantity of liquor, and secondly by extracting to the utmost all the properties contained in the ingredients, and produce a wort, not rich in malt sugar, which during fermentation causes a high attenuation and a beverage rich in alcohol, but a wort, which contains and produces a good and pure extract of the ingredients.

To produce malt liquors, I provide an apparatus capable of being rendered steam and air tight for each of the different stages of brewing and cause the latter to take place in such apparatus rendered as much as possible devoid of air, and to exclude the atmosphere from the ingredients or wort as they are treated in and conveyed from one apparatus to another to be converted into malt or other liquors, to prevent infection through the atmosphere.

My invention consists of apparatus, in which the ingredients and wort are treated continuously under partial vacuum, and of the arrangement of apparatus to produce such vacuum in each of the said apparatus to suit the different stages of process in the production of malt liquors.

It further consists of apparatus and devices as hereinafter more fully described and pointed out in the claims.

My invention will be more fully understood taken in connection with the accompanying drawings forming part hereof, and showing in cross-section a brew house, cooling and storage-house and illustrating the improved apparatus for conducting the process of brewing malt liquors in application.

In the drawings at the left hand side, is illustrated a brew-house, containing four floors A, B, C, and D. On the upper floor D, is provided a cold water tank $d'$, and a cereal hopper $d^2$; on the third floor C, a warm water tank $c$, a mashing apparatus $c'$ for the rice or other ingredient and a malt hopper $c^2$ is located; on the second floor B are the mashing apparatus $b$ for the malt, a hop vessel $b'$ containing agitating devices, and a condenser $b^2$ for producing as great a vacuum as is possible in the apparatus described and to be described. Projecting above the second floor B is the brewing pan B', surrounded beneath by a platform $a$, accessible by stair cases $a'$ and $a^2$ from the first floor A and second floor B; and on the first floor A is located the wort receiving vessel A' and force pump $a^3$.

At the right hand side of the drawings is shown the cool-storage and shipping-house, which also contains four floors E, F, G, and H. On the upper or fourth floor H is located any preferred cooling apparatus H', a receiving tank H$^2$ for carbonic acid collected from the fermenting tanks, and a carbonic acid compressor $h$ with pump $h'$. On the third floor G are located the closed fermenting tanks G', and on the second floor F are the storage vessels F', which are held under partial vacuum by the pump F$^2$ on the floor B of the brew-house.

The cereal mashing apparatus $c'$, malt mashing apparatus $b$, hop vessel $b'$, brewing pan B' and wort receiving vessel A', are adapted to be hermetically closed, and each is provided with a blow-off valve $v$ and a direct steam inlet $s$ having a valve by which steam can be admitted to each of the said apparatus as may be desired.

To create as great a vacuum as possible in any of the above apparatus, steam is admitted thereto and the apparatus brought under pressure, the blow-off valve $v$ being adjusted to signal when a desired pressure has been reached; the steam is then cut off, the exhaust valve $n$, whereof one is on each apparatus, is opened, and the condenser $b^2$, which may be of any preferred construction for the purpose of exhausting steam from a vessel and thereby creating a partial vacuum therein, is started, by opening the valve $b^3$ in the water pipe $d^3$ leading from the cold water tank $d$. The water after having passed the condenser $b^2$ and drawing with it the steam or rather the condensed water thereof, is discharged into the main $w$, which may lead to a basin from which the water may be raised to the cold water tank $d'$ by a pump, to be used over and over again.

The operation of the different apparatus to produce malt liquors, is as follows:—The cereal mashing apparatus $c'$ and malt mashing apparatus $b$ are brought under as great a vacuum as possible in the manner heretofore described, and a charge of rice or other cereal, and a charge of malt are mashed in their respective apparatus and treated in the well known manner, but under vacuum as before mentioned. The wort from the cereal or rice is then drawn from its apparatus into the malt mashing apparatus $b$ and here thoroughly mixed with the mash extracted from the malt by any agitating device in the mashing apparatus $b$. The condition of the resulting mash may be ascertained by the test glass tubes $b^4$. When it has been found that the mash has been sufficiently treated, it is drawn off into the brewing pan $B'$, in which a partial vacuum has been previously produced as before described, by opening the valve $b^3$. A charge of hop is then prepared in the usual or any preferred manner in the hop vessel $b'$, in which also a partial vacuum has previously been produced, and to which charge, wort from the brewing pan $B'$ or from the mash tub $b$ by a suction or other pipe $b^6$ is conducted, to commingle with the charge of hops. The charge of wort from the mashing apparatus $b$ is boiled in the pan $B'$, from which the air and steam are being drawn, and when the brewing is in progress, the hop wort is added under additional boiling, by opening the valve $b^7$; the condition of the wort can at all times be observed and tested by the test glass tubes $b^8$. The wort is then drawn into the receiving vessel $A'$, in which it may be filtered by perforated bottoms, &c., contained in the said vessel to retain the refuse of the wort. The wort is then forced by a pump $a^3$ through any kind of cooling apparatus located on the top floor H of the cooling house. In the drawings however I have shown a cooler $H'$ of the Bautelet type by which a cooling medium is forced through pipes by the pump $h^2$, and which pipes are mounted within tubes of large diameter adapted to contain the wort. From the cooling apparatus $H'$, the wort passes a filtering apparatus $H^2$ and is then led into the closed fermenting vessels $G'$ by the pipes $h^3$ and valves $h^4$. These closed fermenting vessels communicate with a space where pure air is obtainable by the pipe $g$ having a funnel $g'$, provided if necessary with sieves and disinfectants or absorbing material, to withhold any and all impure gases microbes, &c. All the fermenting vessels $G'$ also communicate with a gas receiver $H^2$, connected to the pump $h'$ to collect all the carbonic acid resulting from the process of fermentation, and keep the remaining space above the liquid under suction. The gases especially carbonic acid resulting from the fermentation, are compressed in the vessel $b$, which communicates with the storage vessels $F'$, so as to be absorbed again by the beverage stored therein drawn from the fermenting vessels $G'$ by the pipes $g^2$. After the beverage has been drawn from the fermenting tanks $G'$, the yeast remaining in the same, may be conducted to the closed tank Y, in which also a partial vacuum has been created and maintained by any suitable devices or the pump $F^2$, may be connected to said tank for this purpose. The yeast may be forced from the tank Y by means of the pump $y$ to the fermenting vessels $G'$, when a fresh charge of wort is deposited in the same.

To better maintain and regulate the temperature in the fermenting vessels $G'$, attemporators of the usual or any preferred construction may be mounted within the same, and used in the well known manner.

In each of the storing vessels $F'$ is produced as great a vacuum as possible by an air pump or its equivalent $F^2$, so that the beverage contained therein may more easily absorb the carbonic acid from the compressor $h$ and also that the aging process of the beverage is enhanced. These storing vessels $F'$ may also contain filtering or clarifying apparatus so that any and all foreign matters still contained in the beer may be withheld in the vessels $F'$.

On the first floor E of the cooling, fermenting and storing house, is located the racking room and shipping department, and the beer is drawn directly from the storage vessels $F'$ into the kegs or other receptacles for shipment.

Having thus described the nature and objects of my invention, what I claim as new, and desire to secure by Letters Patent, is—

1. In a brewery a cereal and malt mashing apparatus, and a hop vessel, each containing stirring devices, a brewing pan and a wort receiving tank, all of which are provided with blow-off valves and means for conducting and cutting off steam into each individual apparatus, in combination with a condenser operating to exhaust the steam and air from each of the said apparatus, to create a partial vacuum therein, substantially as and for the purposes set forth.

2. In a brewery a cereal and malt mashing apparatus, and a hop-vessel, each containing stirring devices, a brewing pan and a wort receiving tank, all of which are connected in series by air tight conduits and adapted to be hermetically closed, in combination with means for exhausting air from the said apparatus, substantially as and for the purposes set forth.

In witness whereof I have hereunto set my hand in the presence of two subscribing witnesses.

JOHN A. MANZ.

Witnesses:
R. W. GILLESPIE,
HERMANN BORMANN.